United States Patent [19]

Berecz et al.

[11] Patent Number: 4,877,362
[45] Date of Patent: Oct. 31, 1989

[54] SHEATHED COMPOSITE BLIND RIVET

[75] Inventors: Imre Berecz, El Toro; Dennis Schultz, Chino; Dennis L. Hinton, Yorba Linda, all of Calif.

[73] Assignee: Microdot Inc., Darien, Conn.

[21] Appl. No.: 886,672

[22] Filed: Jul. 18, 1986

Related U.S. Application Data

[63] Continuation of Ser. No. 727,779, Apr. 26, 1985, Pat. No. 4,478,544.

[51] Int. Cl.⁴ .................................... F16B 13/04
[52] U.S. Cl. ...................... 411/34; 411/43; 411/70; 411/501; 411/908; 411/38
[58] Field of Search .................. 411/34–38, 411/43, 44, 70, 501, 907–909

[56] References Cited

U.S. PATENT DOCUMENTS

| | | | |
|---|---|---|---|
| 2,061,629 | 11/1936 | Huck | 411/34 |
| 2,510,693 | 6/1950 | Green | 411/501 |
| 2,545,752 | 3/1951 | Singleton | 411/43 |
| 3,489,312 | 1/1970 | Hunckler et al. | 411/34 |
| 3,492,909 | 2/1970 | Triplett | 411/34 |
| 4,376,604 | 3/1983 | Pratt et al. | 411/34 |
| 4,402,638 | 9/1983 | Tanaka | 411/34 |
| 4,451,189 | 5/1984 | Pratt | 411/34 |
| 4,457,652 | 7/1984 | Pratt | 411/38 |
| 4,478,543 | 10/1984 | Lyon | 411/34 |
| 4,478,544 | 10/1984 | Strand | 411/34 |

FOREIGN PATENT DOCUMENTS

| | | | |
|---|---|---|---|
| 2308808 | 9/1973 | Fed. Rep. of Germany | 411/38 |
| 2360159 | 6/1974 | Fed. Rep. of Germany | 411/34 |
| 812993 | 3/1981 | U.S.S.R. | 411/908 |
| 594859 | 11/1947 | United Kingdom | 411/43 |
| 625331 | 6/1949 | United Kingdom | 411/44 |

Primary Examiner—Gary L. Smith
Assistant Examiner—Suzanne L. Dino
Attorney, Agent, or Firm—Lyman R. Lyon

[57] ABSTRACT

A composite blind plastic rivet having a ductile plastic sheath fully covering the blind head on the rivet to preclude protrusion of fibers upon formation thereof.

1 Claim, 1 Drawing Sheet

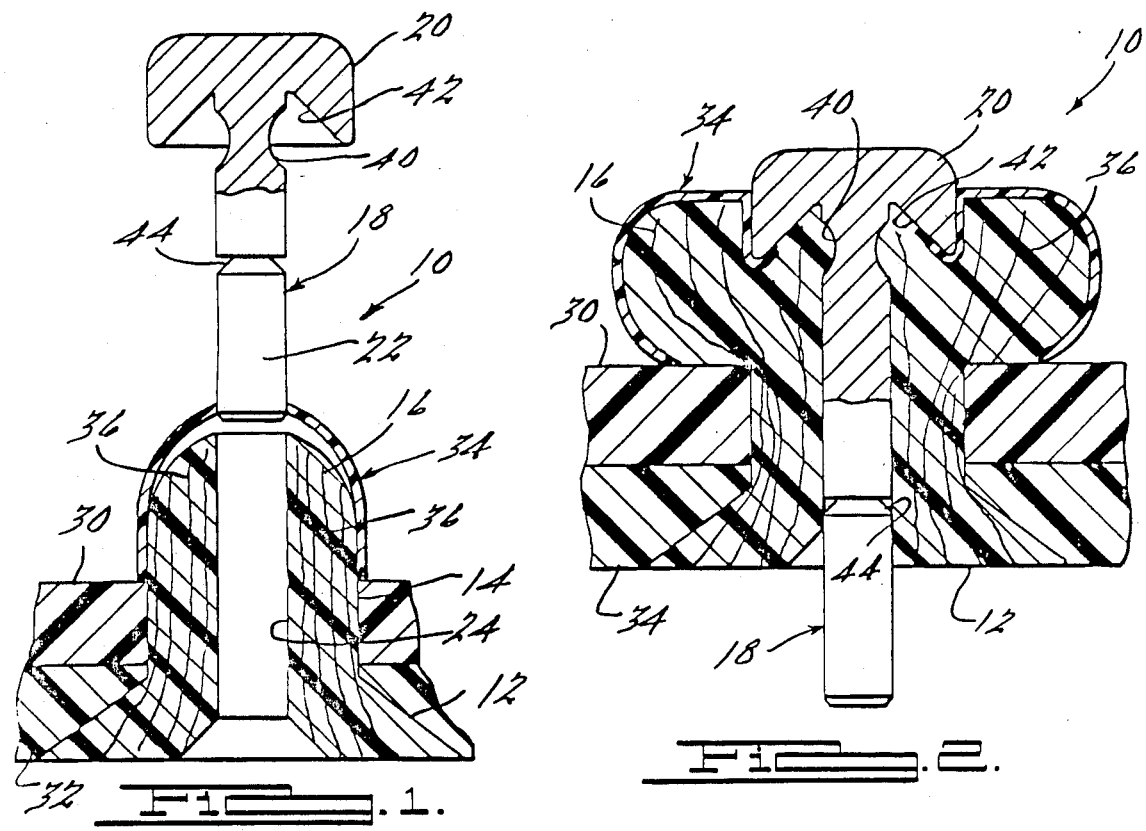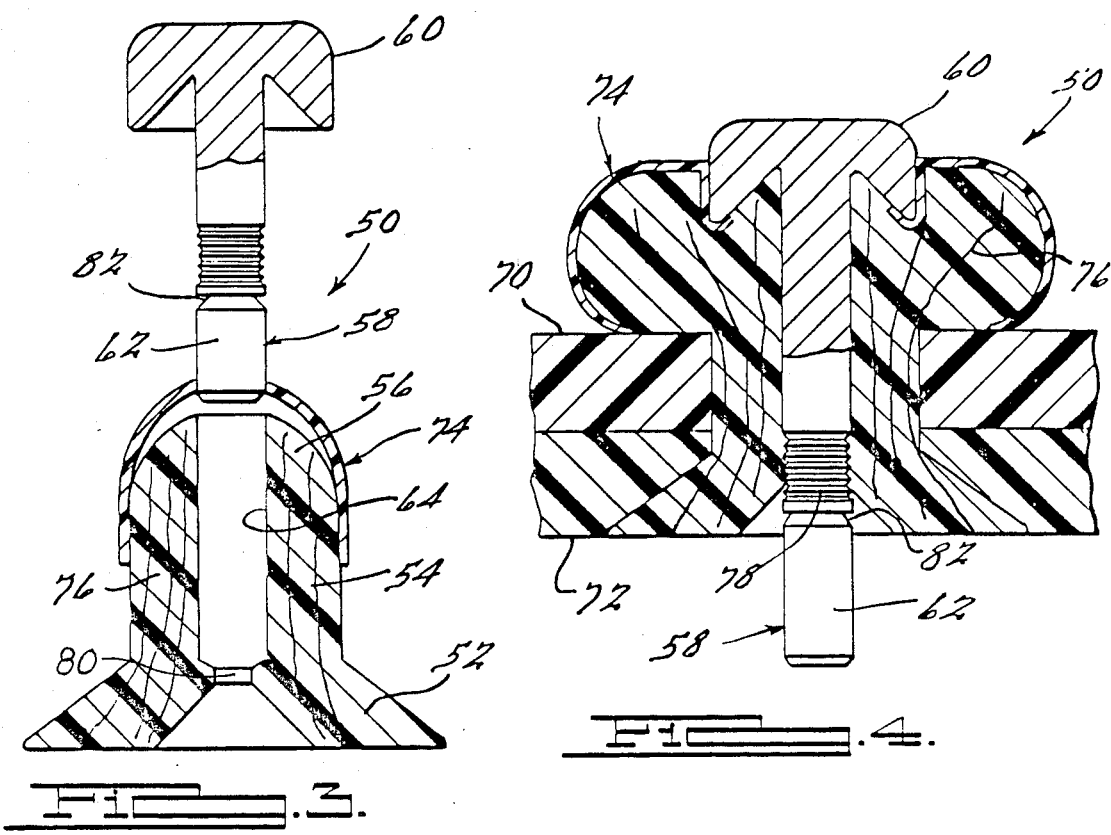

SHEATHED COMPOSITE BLIND RIVET

This is a continuation of application Ser. No. 727,779 filed Apr. 26, 1985 now U.S. Pat. No. 4,478,544.

BACKGROUND OF THE INVENTION

The blind rivet of the instant invention is an improvement on the composite rivet disclosed in U.S. patent application Ser. No. 384,873, filed June 4, 1982, now U.S. Pat. No. 4,478,544 for Composite Rivet, and assigned to the assignee hereof.

Carbon fibre reinforced materials are now widely used in the aircraft industry for both control surfaces and airframe structural components. However, the use of such carbon fibre reinforced resins in blind rivets has been limited by the difficulty of properly forming the blind head. One characteristic of composite materials utilizing carbon fibres is that the material often exhibits a rough finish after reforming due to protrusion or breakage of the carbon fibres. While structural integrity of the material may not be compromised, the end product is abrasive and aesthetically unsatisfactory. When such material is employed in the reformable head of a blind rivet, the problem becomes acute since the blind head extends above the surface of the workpiece.

Another problem that must be addressed is that plastic cold flow of the rivet components tends to reduce clamp-up forces on a workpiece. Thus, pretension of the rivet is highly desirable to offset ultimate relaxation of the tensile forces.

SUMMARY OF THE INVENTION

The aforesaid problem is solved by the rivet of the present invention by encapsulating the carbon fibres and thermoset resin matrix in a resilient sheath. The sheath controls deflection and projection of the carbon fibres upon formation of the rivet head. In both disclosed embodiments of the invention, compression of the resin matrix, preferably a "B" stage thermoset resin matrix and surrounding sheath, which are softened due to the application of heat, forms a radially extending rivet head that is integral with the shear portion of the rivet and which, when fully polymerized, forms a riveted connection that exhibits relatively high shear strength. The configuration of the sheath and the mandrel of the rivet insure maintenance of clamp-up forces.

BRIEF DESCRIPTION OF THE DRAWINGS

FIG. 1 is an elevational view, partially in cross section, of one embodiment of the sheathed composite blind rivet of the instant invention.

FIG. 2 is a view of the rivet of FIG. 1 after tensioning of the rivet mandrel to form a blind head on the rivet.

FIG. 3 is a view similar to FIG. 1 of another embodiment of the instant invention.

FIG. 4 is a view of the rivet of FIG. 3 after tensioning of the mandrel thereof to form a blind head on the rivet.

DETAILED DESCRIPTION OF THE PREFERRED EMBODIMENT OF THE INVENTION

As best seen in FIG. 1 of the drawings, a rivet 10 in accordance with a constructed embodiment of the instant invention comprises a carbon fibre reinforced resin matrix, preferably, a "B"-stage thermoset resin preform having a head portion 12, a shear portion 14, a blind head forming portion 16, and a mandrel 18. The mandrel 18 has an anvil 20 at one end thereof and a tensioning stem 22 at the other end thereof. The mandrel 18 is journaled in a complementary aperture 24 that extends through the head, shear and head forming portions 12, 14 and 16, respectively, of the rivet 10. The shear portion 14 of the rivet 10 is coextensive with the cumulative thickness of a pair of workpieces 30 and 32.

As seen in FIG. 2 of the drawings, the mandrel 18 is adapted to be pulled, after heating, by a tool (not shown) of conventional design resulting in deformation of head forming portion 16 of the rivet 10 into the mushroom configuration shown.

In accordance with one feature of the instant invention, the head forming portion 16, of the rivet 10, is encapsulated by a nylon sheath 34 which expands to the configuration of the blind head and completely covers said head eliminating protrusion of carbon fibres 36 that are impregnated or encapsulated in the resin matrix. Thus, a smooth exterior surface is presented on the blind head which is not abrasive and is aesthetically pleasing. It is to be noted that the sheath 34 is mechanically trapped under the anvil portion 20 of the mandrel 18 yet does not extend entirely under the anvil 20. Moreover, while the sheath 34 contacts the workpiece 30, it does not extend under the head 16 of the blind rivet 10. Thus, radially outward plastic cold flow of the sheath 34 will not effect a reduction in clamp-up force of the rivet 10.

In accordance with another feature of the instant invention, the mandrel 18 is provided with an annular groove 40 in the stem 22 thereof and a truncated conical recess 42 in the anvil 20 thereof that coact to force resin into the groove 40 to effect axial and radial flow of the plastic material thereby to effect tensioning of the mandrel and locking thereof within the head forming portion 16 of the rivet 10. A breakoff groove 44 is provided in the stem 22 to facilitate removal of the excess stem portion after setting of the rivet 10.

As seen in FIGS. 3 and 4 of the drawings, a second embodiment of the instant invention comprises a rivet 50 consisting of a carbon fibre reinforced resin matrix, preferably a "B"-stage thermoset resin rivet 50 having a head portion 52, of any desired configuration, a shear portion 54, a blind head forming portion 56, and a mandrel 58. The mandrel 58 has an anvil 60 at one end thereof and a tensioning stem 62 at the other end thereof. The mandrel 58 is journaled in a complementary aperture 64 that extends through the head, shear and head forming portions 52, 54 and 56, respectively, of the rivet 50. The shear portion 54 of the rivet 50 is coextensive with the cumulative thickness of a pair of workpieces 70 and 72.

As seen in FIG. 4 of the drawings, the mandrel 58 is adapted to be pulled, after heating of the entire rivet assembly by a tool resulting in deformation of the head forming portion 56 of the rivet 50 into the mushroom configuration shown.

The head forming portion 56, of the rivet 50, is encapsulated by a nylon sheath 74 which expands to the configuration of the blind head eliminating protrusion of carbon fibres 76 that are impregnated or encapsulated in the resin matrix. It is to be noted that the sheath 74 does not extend entirely under the anvil 60. Moreover, while the sheath 74 contacts the workpiece 70, it does not extend under the head 56 of the blind rivet 50. Thus, radially outward plastic cold flow of the sheath 74 will not effect a reduction in clamp-up force of the rivet 50.

In accordance with another feature, the mandrel 58 is provided with a plurality of ratchet grooves 78 in the stem 62 thereof that coact with an annular rib 80 in the bore 64 of the rivet 10 and which, in conjunction with radial flow of the plastic material effects locking of the mandrel 58 within the head portion 52 of the rivet 50. A breakoff groove 82 is provided in the stem 62 to facilitate removal of the excess stem portion after setting of the rivet 50.

While the preferred embodiment of the invention has been disclosed, it should be appreciated that the invention is susceptible of modification without departing from the scope of the following claims.

We claim:

1. A blind plastic rivet for acceptance in an aperture in a workpiece, said rivet comprising:

a tubular body portion, a head forming portion, a mandrel extending centrally of the body portion of said rivet and having a stem portion at one end an anvil at the other end overlying the head forming portion of said rivet, said mandrel being movable axially relative to the body and head forming portions of said rivet to form a radially expanded blind head on the head forming portion of said rivet, said body and head forming portions comprising a plurality of substantially continuous carbon fibres encapsulated in a resin matrix, the head forming portion of said rivet being radially deformable upon heating thereof, and a tubular, ductile, elastically expandable plastic sheath separate from said body portion but fully covering the blind head on said rivet, said sheath having one end portion initially engaged with said workpiece and movable to a position partially underlying the head forming portion of said rivet at the radially outer extremity thereof after deformation of said head forming portion, an opposite end portion of said sheath being initially disposed in close proximate relation to and about the stem portion of said mandrel and movable to a position partially underlying the anvil on said mandrel at the radially outer extremity thereof so as to be mechanically retained by said anvil, the head on said rivet having radially inner portions in direct engagement with both the anvil on said mandrel and the workpiece.

* * * * *